United States Patent
Kent

(10) Patent No.: US 12,151,391 B2
(45) Date of Patent: Nov. 26, 2024

(54) COPING CUT MACHINE FOR CARPENTRY MOLDING

(71) Applicant: Roger Kent, Bluffdale, UT (US)

(72) Inventor: Roger Kent, Bluffdale, UT (US)

( * ) Notice: Subject to any disclaimer, the term of this patent is extended or adjusted under 35 U.S.C. 154(b) by 0 days.

(21) Appl. No.: 17/179,104

(22) Filed: Feb. 18, 2021

(65) Prior Publication Data

US 2021/0283799 A1 Sep. 16, 2021

Related U.S. Application Data

(63) Continuation-in-part of application No. 16/530,537, filed on Aug. 2, 2019, now abandoned.

(51) Int. Cl.
  *B27C 5/06* (2006.01)
  *B23Q 9/00* (2006.01)
  *B27G 5/04* (2006.01)

(52) U.S. Cl.
  CPC .............. *B27C 5/06* (2013.01); *B23Q 9/0085* (2013.01); *B27G 5/04* (2013.01)

(58) Field of Classification Search
  CPC .... B27C 5/06; B27C 5/02; B27C 5/00; B27C 1/14; B27C 1/02; B27G 5/04; B23Q 9/0085; B23D 61/02; B27B 33/08
  (Continued)

(56) References Cited

U.S. PATENT DOCUMENTS 353,415 A * 11/1886 Drake ................... B24B 19/12
  451/239
1,240,769 A * 9/1917 Osteman .................. B27C 1/14
  144/129
(Continued)

FOREIGN PATENT DOCUMENTS

NZ   1021782 C2 * 5/2004 ............... B27G 1/00

OTHER PUBLICATIONS twomakeahome.com.; "How to Install Crown Moulding (Prepping, Coping, and Final Touches.)" Jul. 16, 2018, Retrieved from <URL: Https://web.archive.org/web20180716034353/https://twomakeahome.com/how-to-install-crown-moulding-preping-coping-and-final-touches/> 11 Pages.

(Continued)

*Primary Examiner* — Ghassem Alie
(74) *Attorney, Agent, or Firm* — HOLLAND & HART LLP

(57) ABSTRACT

A coping cut machine can include a workpiece platform having a support surface for receiving a workpiece support surface. The coping cut machine can have first and second rotary cutting devices, each supporting at least one knife, and at least one workpiece alignment member supported by the workpiece platform for aligning a workpiece supported by the workpiece platform relative to at least one of the first and second rotary cutting devices. In response to sliding the workpiece along the at least one workpiece alignment member and during rotation of at least one of the first and second rotary cutting devices, the at least one knife operates to perform a coping cut on an end of the workpiece. The first and second rotary cutting devices can optionally be rotated in opposite directions to cut either end of a workpiece. At least one of the first and second rotary cutting devices can comprise a modular rotary cutting assembly having a keyed profile portion received in a keyed profile aperture of a drive wheel, and that is removable from the coping cut machine.

14 Claims, 12 Drawing Sheets

(58) Field of Classification Search
USPC ............... 83/663, 837, 848, 698.41, 698.51;
144/131, 216, 137, 359, 114.1, 117.1,
144/218, 132, 172, 253.1, 253.8
See application file for complete search history.

(56) References Cited

U.S. PATENT DOCUMENTS

| | | | | |
|---|---|---|---|---|
| 2,102,186 | A * | 12/1937 | Nicholson | .................. B27C 1/08 |
| | | | | 144/114.1 |
| 2,312,439 | A * | 3/1943 | Peterson | .................. B27C 1/08 |
| | | | | 144/116 |
| 2,859,780 | A * | 11/1958 | Carlson | .................... B27C 1/06 |
| | | | | 144/246.2 |
| 4,282,996 | A * | 8/1981 | Maeda | .................. B23D 19/06 |
| | | | | 83/108 |
| 4,485,859 | A * | 12/1984 | Krogstad | ........... B23Q 11/0046 |
| | | | | 83/100 |
| 4,640,161 | A * | 2/1987 | Kurk | .................... B23D 45/146 |
| | | | | 83/213 |
| 4,641,559 | A | 2/1987 | Castiglioni | |
| 4,820,091 | A | 4/1989 | Koski | |
| 4,842,029 | A * | 6/1989 | De Abreu | .............. B27G 23/00 |
| | | | | 144/134.1 |
| 4,919,176 | A | 4/1990 | Gachet et al. | |
| 5,161,589 | A | 11/1992 | DeBiagio | |
| 5,778,951 | A | 7/1998 | Huising | |
| 5,996,659 | A | 12/1999 | Burgess | |
| 6,142,199 | A | 11/2000 | Schigline | |
| 6,322,296 | B1 | 11/2001 | Wetli et al. | |
| 6,374,879 | B1 | 4/2002 | Luckhart | |
| 6,422,117 | B1 | 7/2002 | Burch | |
| 6,481,320 | B1 | 11/2002 | McGrory et al. | |
| 6,619,345 | B2 * | 9/2003 | Havumaki | ................ B27L 1/02 |
| | | | | 144/208.9 |
| 6,644,369 | B1 * | 11/2003 | Chiang | .................. B27G 13/04 |
| | | | | 407/41 |
| 6,769,472 | B2 | 8/2004 | Lee | |
| 7,143,795 | B1 | 12/2006 | Davis | |
| 7,424,900 | B2 | 9/2008 | Soga et al. | |
| 7,441,992 | B2 | 10/2008 | Hedberg | |
| 7,533,704 | B2 * | 5/2009 | Chuang | .................... B27C 1/14 |
| | | | | 144/218 |
| 7,913,729 | B2 | 3/2011 | Brcich | |
| 9,561,628 | B2 * | 2/2017 | Ikonomov | ............... B29C 73/26 |
| 2005/0121107 | A1 * | 6/2005 | Lagerstrom | ............ B23D 45/10 |
| | | | | 144/218 |
| 2006/0283303 | A1 * | 12/2006 | Smith | .................. B23D 61/065 |
| | | | | 83/835 |
| 2008/0308185 | A1 * | 12/2008 | Liu | ........................... B27C 1/02 |
| | | | | 144/246.1 |
| 2009/0223598 | A1 * | 9/2009 | Hu | ............................ B27C 1/12 |
| | | | | 144/128 |
| 2011/0277612 | A1 | 11/2011 | Chen | |
| 2014/0325926 | A1 | 11/2014 | Armacost | |

OTHER PUBLICATIONS

PCT Application No. PCT/US20/44732 Filing date Aug. 3, 2020, Roger Kent International Search Report Mailing date Nov. 18, 2020, 26 Pages.

* cited by examiner

COPING CUT MACHINE FOR CARPENTRY MOLDING

RELATED APPLICATION

This application is a continuation in part application of U.S. application Ser. No. 16/530,537, filed Aug. 2, 2019, which is incorporated herein by reference.

BACKGROUND

In the industry of carpentry molding finishing work, a coping cut operation is typically performed on an end of a workpiece (e.g., baseboard, chair rail, crown molding, etc.) before installation of the workpiece to a wall, and that is adjacent another workpiece that is already installed to a wall. The purpose of performing such coping cutis to minimize the appearance of gaps at the interface between adjacent workpieces, such as in the corners of walls and ceilings, to provide a seamless (or nearly seamless) trim work around a room. Typically, a carpenter performs such coping cut by hand with a hand saw or tool, which is time consuming, cumbersome, and often inaccurate due to various curves and edges that are cut in a coping cut operation. This "manual" coping cut often results in visible gaps between adjacent workpieces because of inaccurate cuts, which is unacceptable in the case of stained hardwood moldings (e.g. that cannot be filled with caulking), and which can be difficult to accurately caulk or fill in the case of moldings that are subsequently painted.

SUMMARY

Accordingly a workpiece platform can comprise a support surface for receiving a workpiece, and an opening formed through the support surface. First and second rotary cutting devices can each support at least one knife which is at least partially extendable (e.g. movable) upwardly through the opening during rotation of at least one of the first and second rotary cutting devices. At least one workpiece alignment member can be supported by the workpiece platform which aligns a workpiece supported by the workpiece platform relative to at least one of the first and second rotary cutting devices. In response to sliding the workpiece along the at least one workpiece alignment member and during rotation of at least one of the first and second rotary cutting devices, the at least one knife operates to perform a coping cut on an end of the workpiece.

There has thus been outlined, rather broadly, the more important features of the invention so that the detailed description that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments and are not, therefore, to be considered limiting of its scope. Furthermore, it will be readily appreciated that the components, as generally described and illustrated in the figures herein, could be arranged in a wide variety of configurations.

Figure 1A:
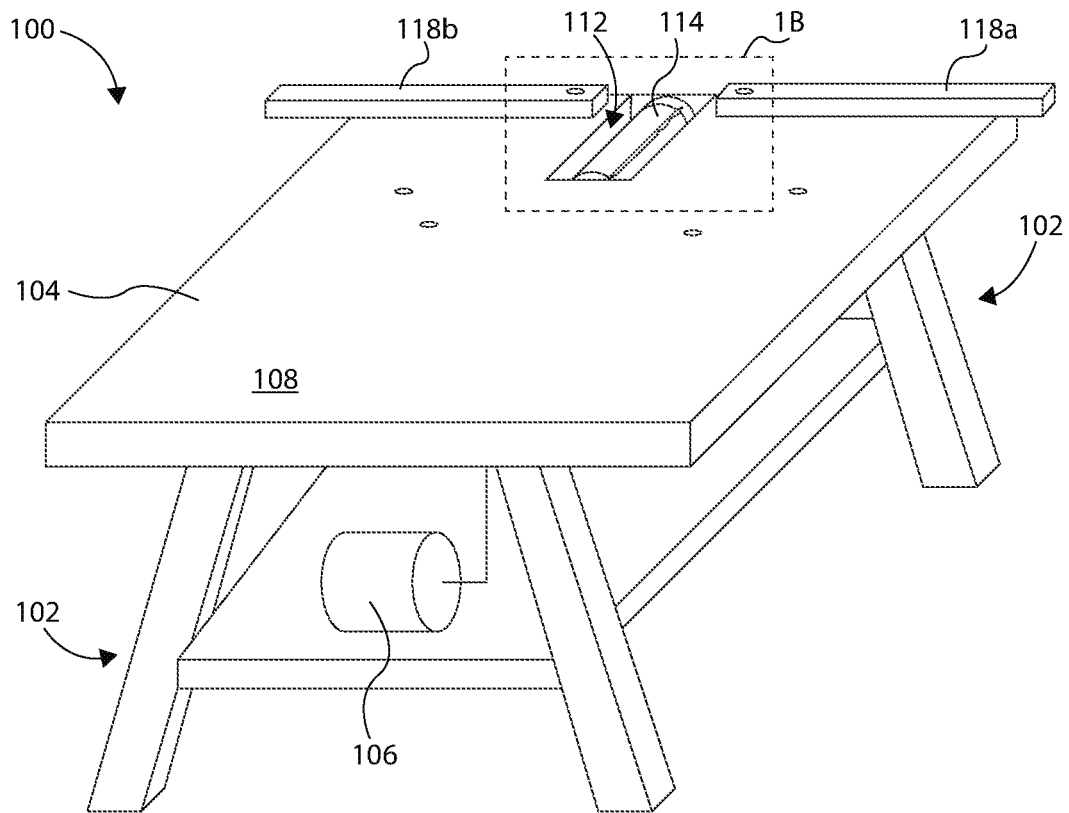
FIG. 1A is a coping cut machine, in accordance with an example of the present disclosure.
Figure 1B:
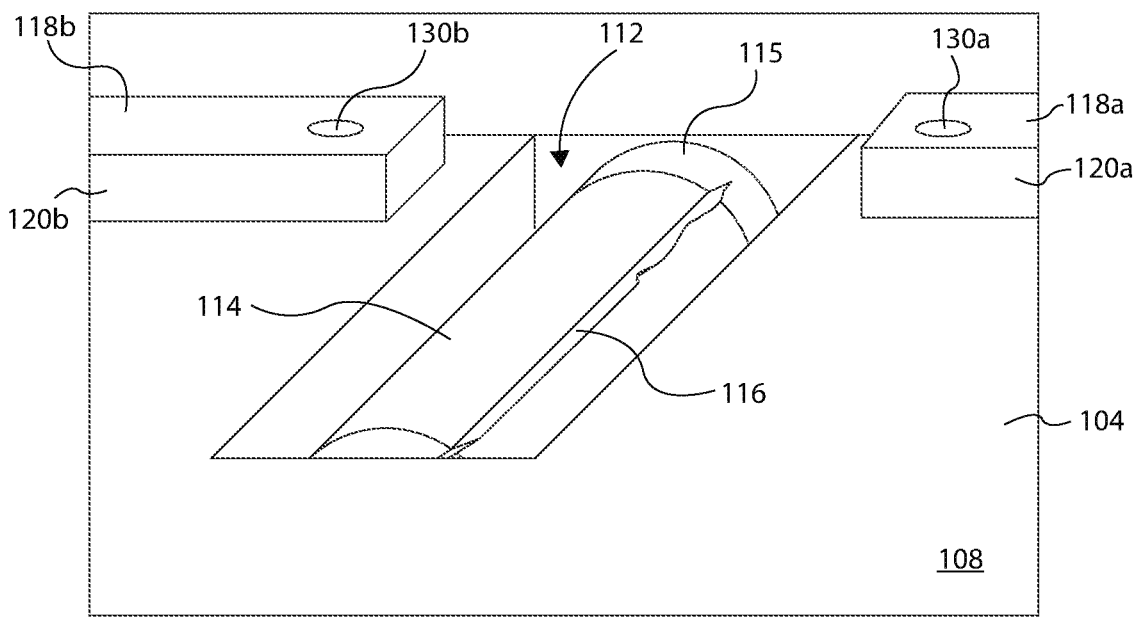
FIG. 1B is a close-up view of a section of the coping cut machine of FIG. 1A.

These drawings are provided to illustrate various aspects of the invention and are not intended to be limiting of the scope in terms of dimensions, materials, configurations, arrangements or proportions unless otherwise limited by the claims.

DETAILED DESCRIPTION

Reference will now be made to exemplary invention embodiments and specific language will be used herein to describe the same. It will nevertheless be understood that no limitation in scope is thereby intended. Alterations and further modifications of inventive features described herein, and additional applications of inventive principles which would occur to one skilled in the relevant art having possession of this disclosure, are to be considered as inventive subject matter. Further before particular embodiments are disclosed and described, it is to be understood that this disclosure is not limited to the particular process and materials disclosed herein as such may vary to some degree. It is also to be understood that the terminology used herein is used for the purpose of describing particular embodiments only and is not intended to be limiting.

Definitions

In describing and claiming the present invention, the following terminology will be used.

The singular forms "a," "an," and "the" include plural referents unless the context clearly dictates otherwise. Thus, for example, reference to "a platform" includes reference to one or more of such materials and reference to "cutting" refers to one or more such steps.

As used herein, the term "about" refers to a degree of deviation based on experimental error typical for the particular property identified. The latitude provided the term "about" will depend on the specific context and particular property and can be readily discerned by those skilled in the art. When used in connection with a numerical value, the term "about" is used to provide flexibility and allow the given value to be "a little above" or "a little below" the specific number stated. Further, unless otherwise stated, the term "about" shall expressly include "exactly," consistent with the discussion below regarding ranges and numerical data.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

In this disclosure, "comprises," "comprising," "comprised," "containing," "having," and the like can have the meaning ascribed to them in U.S. Patent law and can mean "includes," "including," and the like, and are generally interpreted to be open ended terms. The term "consisting of" is a closed term, and includes only the methods, compositions, components, systems, steps, or the like specifically listed, and that which is in accordance with U.S. Patent law. "Consisting essentially of" or "consists essentially" or the like, when applied to devices, methods, compositions, components, structures, steps, or the like encompassed by the present disclosure, refer to elements like those disclosed herein, but which may contain additional structural groups, composition components, method steps, etc. Such additional devices, methods, compositions, components, structures, steps, or the like, etc., however, do not materially affect the basic and novel characteristic(s) of the devices, compositions, methods, etc., compared to those of the corresponding devices, compositions, methods, etc., disclosed herein. In further detail, "consisting essentially of" or "consists essentially" or the like, when applied to the methods, compositions, components, systems, steps, or the like encompassed by the present disclosure have the meaning ascribed in U.S. Patent law and is open-ended, allowing for the presence of more than that which is recited so long as basic or novel characteristics of that which is recited is not changed by the presence of more than that which is recited, but excludes prior art embodiments. In this specification when using an open ended term, like "comprising" or "including," it is understood that direct support should be afforded also to "consisting essentially of" language as well as "consisting of" language as if stated explicitly and vice versa. Each term provides support for the others as if expressly stated.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Coping Cut Machine for Carpentry Molding

A coping cut machine can comprise a workpiece platform comprising a support surface for receiving a workpiece, and comprising an opening formed through the support surface. The coping cut machine can also comprise a rotary cutting device supporting at least one knife at least partially extendable or protrudable (e.g. movable) upwardly through the opening during rotation of the rotary cutting device, and can comprise at least one workpiece alignment member supported by the workpiece platform for aligning a workpiece supported by the workpiece platform relative to the rotary cutting device. In response to sliding the workpiece along the at least one workpiece alignment member and during rotation of the rotary cutting device, the at least one knife operates to perform a coping cut on an end of the workpiece.

A complimentary method for performing coping cuts on workpieces can comprise positioning a workpiece on a workpiece platform of a coping cut machine, the coping cut machine comprising a rotary cutting device supporting at least one knife. The method can also comprise operating a motor of the coping cut machine to rotate the rotary cutting device. Although not required, in some cases the at least one knife rotates and extends through an opening of the workpiece platform. The method can comprise cutting an end of the workpiece with the at least one knife to produce a coping cut profile of the workpiece, whereby the coping cut profile is shaped to mate with an outer surface of another workpiece.

Figure 8:
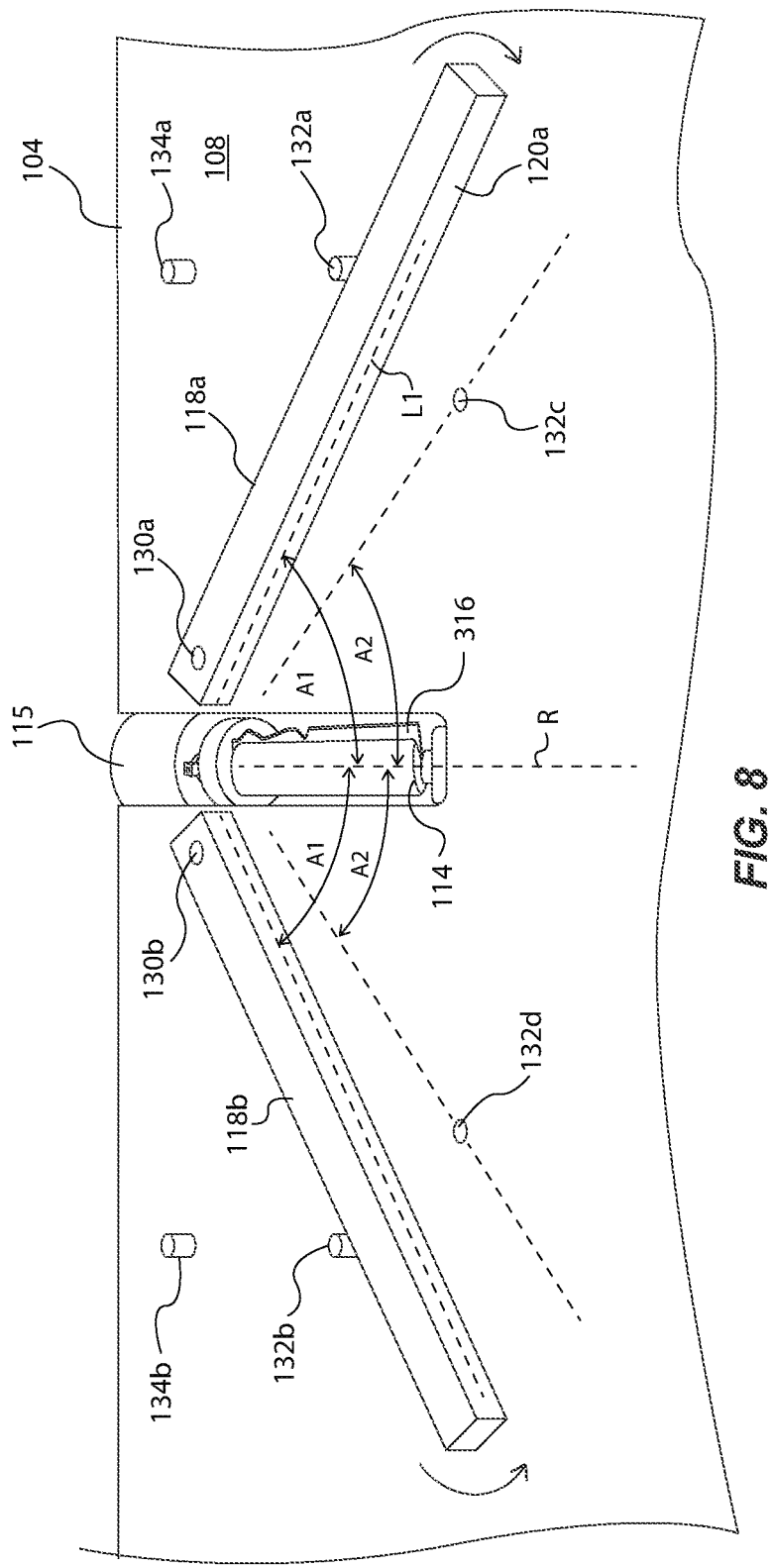
FIG. 8 shows the coping cut machine of FIG. 1A, and showing workpiece alignment members rotated into respective transverse cutting positions (e.g. for crown molding cuts angled on two axes), in accordance with an example of the present disclosure.
Figure 9:
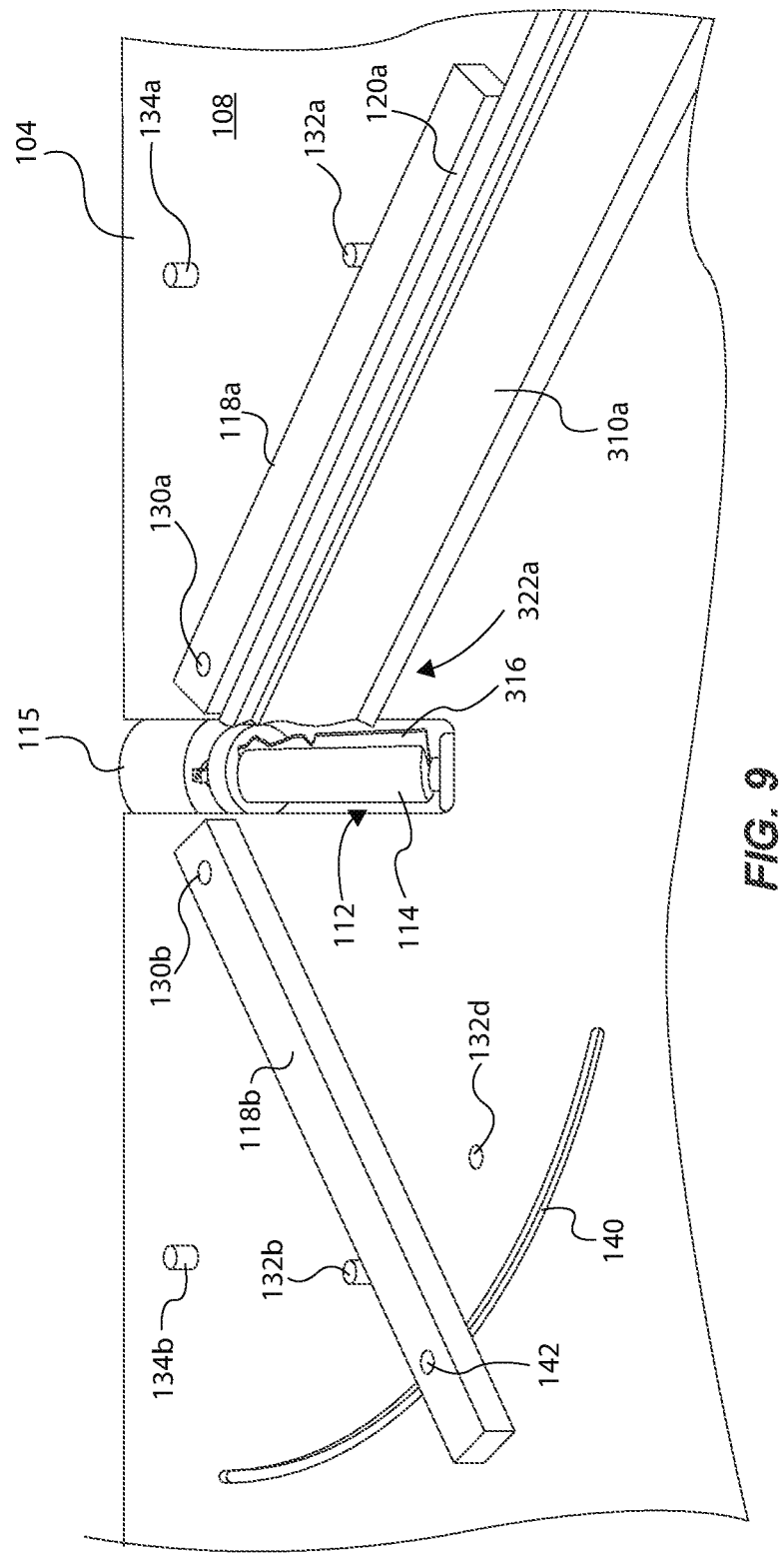
FIG. 9 shows the coping cut machine of FIG. 8, and showing a right workpiece (i.e., crown molding) interfaced to a right workpiece alignment member for performing a coping cut with the rotary cutting device.

FIGS. 1A-4 show various aspects and views of a coping cut machine 100 for performing a coping cut on a piece of baseboard or chair rail molding, and FIGS. 8 and 9 shows additional functionality of the coping cut machine 100 for performing a coping cut on a segment of crown molding. As an overview, the coping cut machine 100 is operable to perform a coping cut on either ends of a workpiece (e.g., baseboard, crown molding), and in a single cutting operation.

More specifically, the coping cut machine 100 can comprise a base structure 102, which can include a number of support legs and other structures, and which can be positionable on a ground surface or other stable substrate. In this manner, the coping cut machine 100 can be portable or movable by a user or lift. In another example, the base structure can be shorter or more compact, so that it can be positioned on a table top or other elevated support base. The coping cut machine 100 can further comprise a workpiece platform 104 supported by the base structure 102, and a motor 106 such as a DC electric motor, battery operated motor, or other suitable motor. The workpiece platform 104 can comprise a panel or plate like structure, which includes a support surface 108 for supporting and receiving a workpiece to be cut, such as the workpieces 110a and 110b shown in FIG. 2 (and FIGS. 4, 5, and 9). The support surface 108 can have a planar upper surface, or it can be generally planar or flat along the entire surface area, such as with support surfaces that may be corrugated, ribbed, mesh, etc.

The workpiece platform 104 can further comprise an opening 112 formed through the support surface 108. The coping cut machine 100 can also comprise at least one rotary cutting device 114 operably coupled to the motor 106 in a suitable manner for rotatably driving the rotary cutting device 114 with the motor 106 during operation. Note that the motor 106 is shown schematically as coupled to the rotary cutting device 114 from underneath the workpiece platform 104 in FIG. 1A, but it should be appreciated that the motor 106 would comprise an output shaft coupled directly or indirectly to the rotary cutting device 114 in a suitable or typical manner, so that operation of the motor 106 causes rotation of the rotary cutting device 114. For example, a direct axle linkage, a belt-pulley system, chain-driven belt drive, geared rotary system, etc. may be used to transfer rotary motion from the motor 106 to the rotary cutting device 114.

The rotary cutting device 114 can be formed of a rigid material, such as steel, and can be shaped as a cylindrical body or cylinder. A free end of the rotary cutting device 114 can be supported by a collar bearing 115 supported by the base structure 102 or by the workpiece platform 104 to stabilize and support the rotary cutting device 114 during use, such that the rotary cutting device 114 can effectively rotate about an axis of rotation at high speeds. The rotary cutting device 114 can be supported at one or both ends. An optional release mechanism can allow for the rotary cutting device to be removed for repair, cleaning, or replacement of blades. Similarly, the blades 116 can be removable from the corresponding cylinder body of the rotary cutting device 114. Such action can allow for replacement of damaged blades or to provide a different cut profile. Pins, bolts, or other retention mechanisms can be used to secure blades 116 within the cylinder body. The rotary cutting device 114 can support at least one knife 116 that at least partially extends upwardly through, or protrudes beyond, the opening 112 of the workpiece platform 104 during rotation of the rotary cutting device 114. The knife 116 can be removably coupled to the rotary cutting device 114 by a suitable means, such as by one or more fasteners. Attaching a removable knife to a rotary structure is well known and will not be discussed in detail. Note that the knife 116 may only extend upwardly through the opening 112 during rotation of the rotary cutting device 114, so it may depend on the rotation position of the knife 116 relative to the workpiece platform 104 whether the knife 116 extends through the opening 112, and beyond/ above the support surface 108. The at least one knife exemplified herein can comprise a plurality of knives or cutting members supported by the rotary cutting device, and that are spaced apart and arranged around a circumferential perimeter of the rotary cutting device, such as discussed below regarding the examples of FIGS. 4 and 5. Optionally, the vertical height of the rotary cutting device 114 can be adjustable to allow for changing a cut depth (i.e. for different molding thickness). For example, the rotary cutting device, motor, and/or table surface can be movable and adjustable. Thus, the distance that the knife extends above the top surface of the workpiece platform 104 can be varied. Typically, a variable distance of up to about 2 inches (and most often up to about 1 inch) will accommodate standard trim pieces. Vertical position adjustment can be provided using any suitable mechanism which varies relative position of the rotary cutting device 114 and the workpiece platform 104. Non-limiting examples of such mechanisms can include a geared elevation system, a lockable sliding mechanism, screw elevation mechanism, articulated linkages, and the like.

Figure 2:
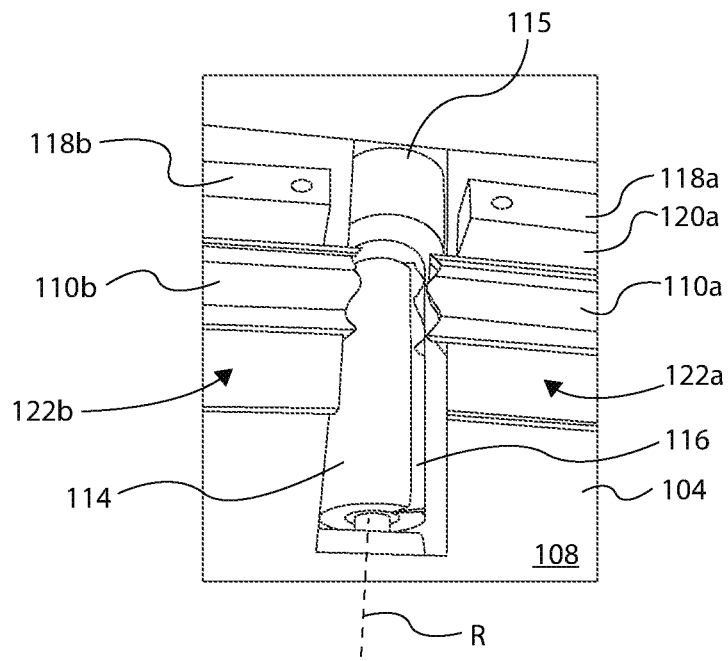
FIG. 2 is a top down close-up view of a section of the coping cut machine of FIG. 1A, and showing left and right workpieces (i.e., baseboard, chair rail) situated on either side of a rotary cutting device of the coping cut machine of FIGS. 1A-2.
Figure 7:
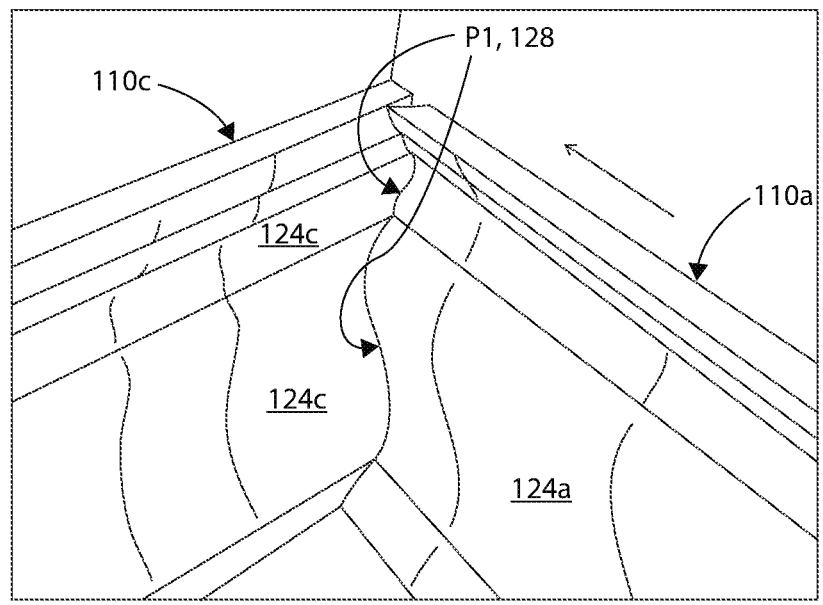
FIG. 7 shows the right workpiece of FIG. 6 mated or interfaced to an adjacent workpiece installed on a wall.

The coping cut machine 100 can further comprise at least one workpiece alignment member, such as a pair of opposing workpiece alignment members 118a and 118b, supported by the workpiece platform 104 on either side of the opening 112 for aligning a workpiece supported by the workpiece platform 104 relative to the rotary cutting device 114. Each workpiece alignment member 118a and 118b can be secured to the workpiece platform 104, or can be removably supported by the workpiece platform 104, to align a workpiece and to facilitate sliding of the workpiece along one of the workpiece alignment members 118a and 118b during a coping cut operation. Although a single workpiece alignment member can be used, opposing pairs can allow for cutting both right and left ends of workpieces without reversing a cutting direction and/or orientation of the blades of the rotary cutting device 114. As illustrated in FIG. 2, a backside surface (hidden from view) of the workpiece 110a can be supported along the support surface 108 of the workpiece platform 104, and a top side or edge of the workpiece 110a can be interfaced along a planar guide surface 120a of the workpiece alignment member 118a in preparation of the coping cut. Note that the backside surface of the workpiece 110a is the surface that is interfaced to a wall when installed to the wall, and the top side surface or edge is the top surface that is exposed and visible, as shown in FIG. 7, for instance.

The workpieces 110a and 110b are shown in FIG. 2 as already having the coping cut performed on respective ends 122a and 122b for purposes of illustration. Accordingly, in one example of performing a coping cut in a single operation with the coping cut machine 100, a user can position the workpiece 110a on the workpiece platform 104 as shown, so that the workpiece 110a is interfaced along the workpiece alignment member 118a. At this stage, the end 122a of the workpiece 110a will merely have a straight-edge cut that is formed generally orthogonal to the length of the workpiece alignment member 118a, and that is generally parallel to an axis of rotation R of the rotary cutting device 114. This straight-edge cut may be previously performed by another machine, such as a chop saw set at 0 degrees to perform a straight-edge cut. Then, the user can operate or turn on the motor 106, which causes clockwise rotation of the rotary cutting device 114 so that the knife 116 rotates and passes through or extends beyond the opening 112 upon each consecutive revolution of the rotary cutting device 114. While the knife 116 rotates in this manner, the user can slide the workpiece 110a (concurrently) along the planar guide surface 120a of workpiece alignment member 118a and along the support surface 108 of the workpiece platform 104, and axially in a direction towards the opening 112. As a result, the knife 116 performs a coping cut on the end 122a of the workpiece 110a from an upper or outer side of the workpiece 110a (in the case where the rotary cutting device 114 is rotating clockwise in FIG. 2), which generates a coping cut profile P1 on the end 122a of the workpiece 110a.

In an alternative configuration the rotary cutting device can be supported near or proximate a side edge of a workpiece platform, so that the knife extends above and beyond the upper surface area of the workpiece platform. In this case, the end of a workpiece can be slid along the workpiece platform toward the side edge of the workpiece platform for performing a coping cut at or near a perimeter area of the workpiece platform. Thus, the opening 112 may not be required or necessary in this example.

Figure 3:
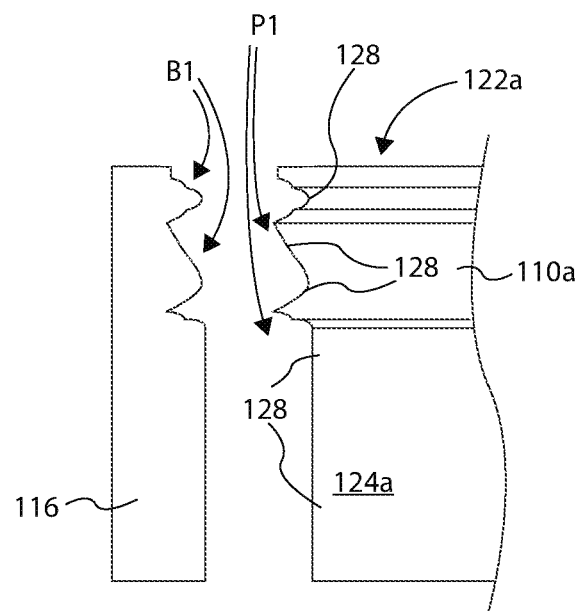
FIG. 3 is a top down view of a blade of the rotary cutting device (left side) and the right workpiece of FIG. 2, showing a coping cut profile of the right workpiece (right side).
Figure 4:
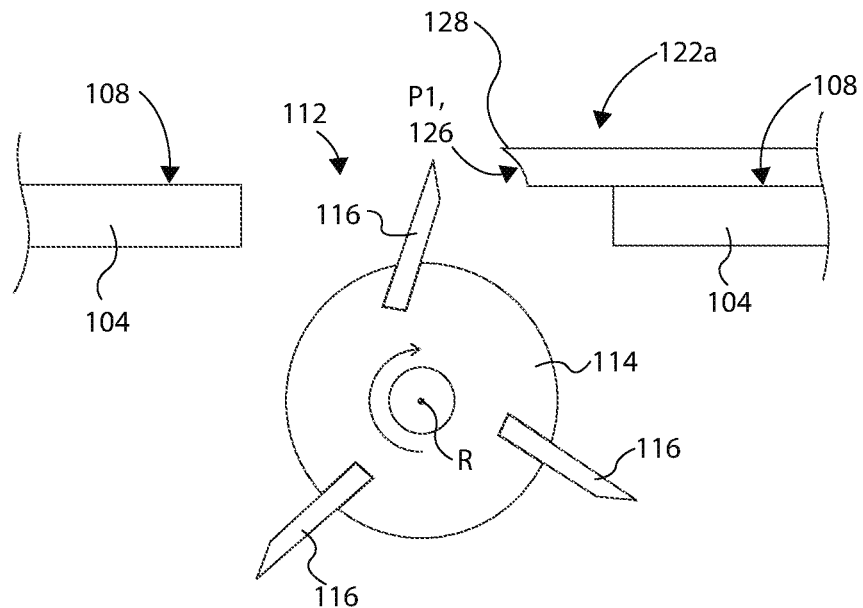
FIG. 4 is a schematic side view of a rotary cutting device of a coping cut machine, and the right workpiece (having a coping cut profile) supported by a workpiece platform of the coping cut machine, in accordance with an example of the present disclosure.
Figure 6:
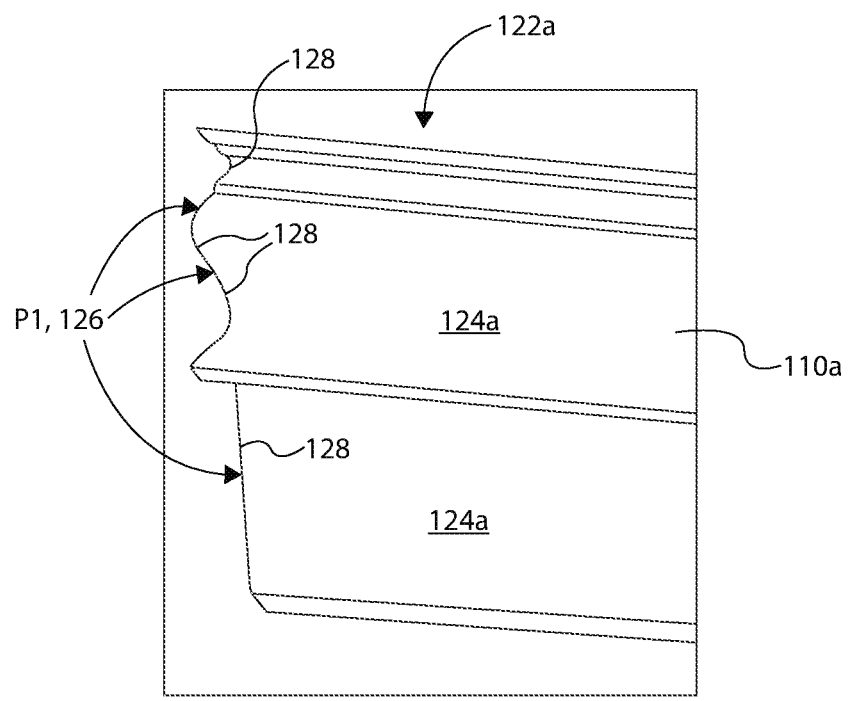
FIG. 6 shows further details of the coping cut profile of the right workpiece of FIG. 4.

As illustrated in FIG. 3, a blade profile B1 of the knife 116 corresponds to the coping cut profile P1 of the workpiece 110a. In this example, the blade profile B1 is defined by a number of blade edge transitions (curved edges, straight edges, etc.) that are a mirror image (or reverse) of an outer surface 124a of the workpiece 110a (and an outer surface of a similar workpiece). As shown in FIG. 6, the coping cut profile P1 can be defined by a side surface 126 that extends from the top edge to the bottom edge of the workpiece 110a. Because of the manner in which the knife 116 rotates and cuts the workpiece 110a along an arc when performing the coping cut, the side surface 126 will have a slight curved cut from the outer surface 124a to the backside surface of the workpiece 110a, as shown in FIG. 4 because of the rotational directional movement of the knife 116 during cutting. This generates a forward facing edge 128 that is the farthest most edge or portion of the end of the workpiece 110a that interfaces with an adjacent workpiece, as shown in FIG. 7.

Accordingly, the forward facing edge 128 (between the side surface 126 and the outer surface 124a) can be interfaced to an outer surface 124c of an adjacent workpiece 110c (FIG. 7) when installed to minimize or eliminate any unacceptable or undesirable gaps between the joint/interface of the workpieces 110a and 110c. Indeed, the adjacent workpiece 110c is similarly shaped or the same style of baseboard (or chair rail) of the workpiece 110a, but instead has a straight-edge cut, and no coping cut, as shown in FIG. 7. Initially, the adjacent workpiece 110c can be installed or secured to a wall in a suitable manner (e.g., glue, carpentry nails, or other industry standard fasteners). Then, the workpiece 110a, which has the coping cut profile P1, can be slidably interfaced against the outer surface 124c of the workpiece 110c, so that the forward facing edge 128 of the side surface 126 is interfaced to the outer surface 124c of the workpiece 110c. Then, the workpiece 110a can be installed the adjacent/orthogonal wall. Interfacing the forward facing edge 128 to the outer surface 124c of the adjacent workpiece 110c provides a cleaner, more aesthetically pleasing joint between the workpieces 110a and 110c, as opposed to interfacing the entire side surface 126 to the workpiece 110c. This is because of the aforementioned slight curved cut of the coping cut profile P1 that is generated by virtue of the rotational arc cut of the knife 116 as it cuts the end of the workpiece 110a. In contrast, prior coping cut methods (e.g., hand/manual cutting) does not have this curved cut accurately that defines the side surface 126 (and profile P1). This is because prior coping cut methods are typically performed from directly above the workpiece. Because of this, there may be an unpleasing or unacceptable gap in certain areas between the joined workpieces. This may be problematic in cases where caulking cannot cover such gaps between joined workpieces, such as is the case with stained molding that does not get painted, and therefore cannot receive any caulking to cover such gaps. Thus, it is desirable to ensure the "cleanest" joint between the workpieces, which is achieved in the present disclosure because of the aforementioned forward facing edge 128 generated by virtue of a rotational cut to the end of the workpiece 100a from underneath the workpiece. It should be appreciated that, in order to generate the forward facing edge 128, the backside surface of the workpiece 110a can be interfaced to the workpiece platform 104, as opposed to interfacing the outer surface 124a to the workpiece platform 104 during the coping cut, which would produce an incorrect or defective forward facing edge resulting in a visible gap between workpieces 110a and 110c.

Figure 1C:
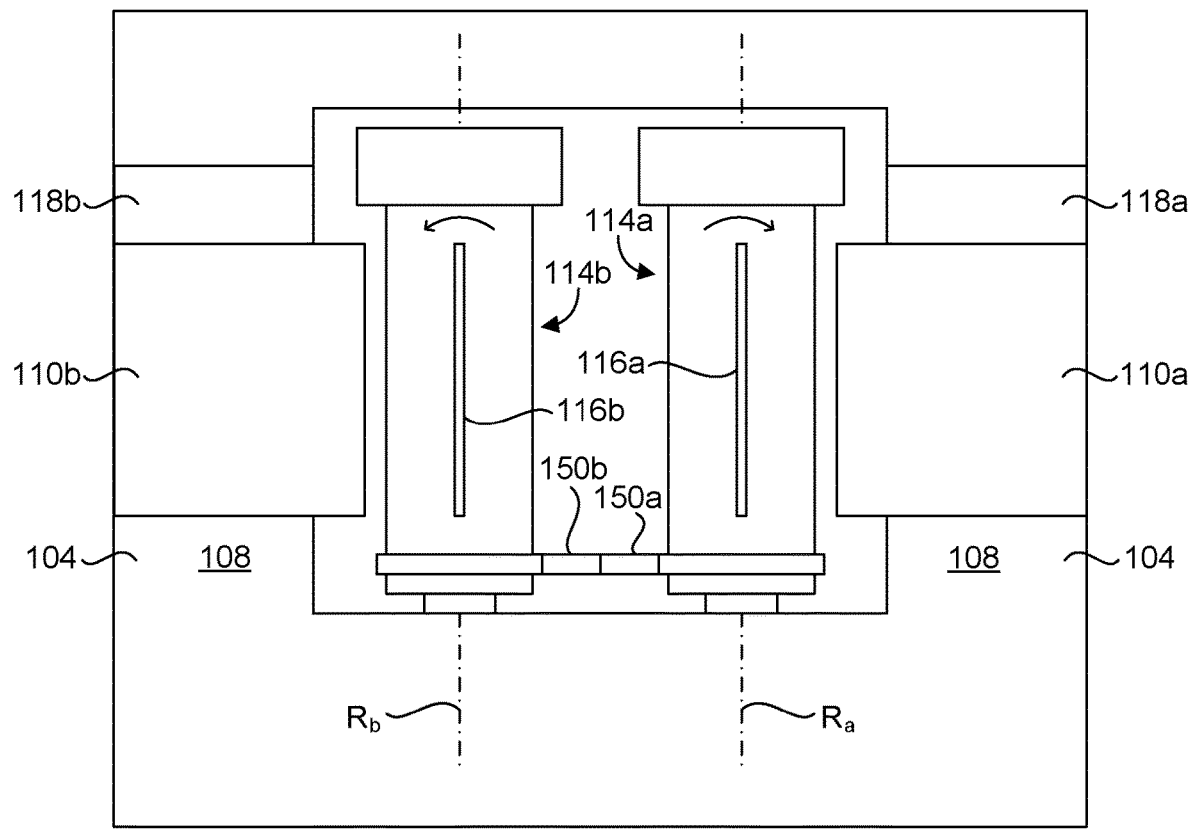
FIG. 1C is a top view of a portion of a coping cut machine in accordance with an example of the present disclosure.
Figure 1D:
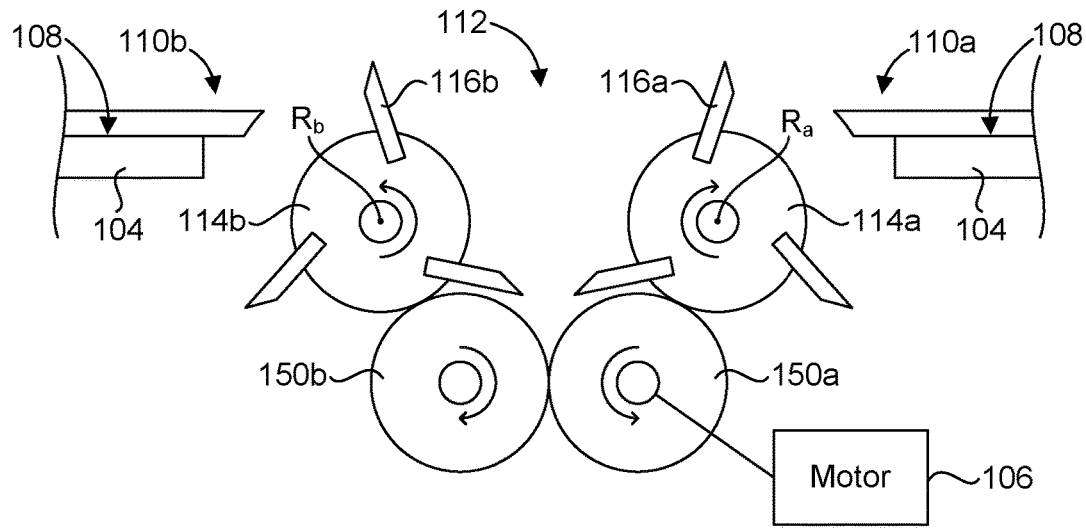
FIG. 1D is a schematic side view of the coping cut machine of FIG. 1C.

In one aspect, illustrated in FIGS. 1C and 1D, the coping cut machine 100 can include multiple (e.g., two) rotary cutting devices 114a, 114b for cutting the workpieces 110a, 110b from opposite sides or directions. In this example, the rotary cutting device 114a can be configured to rotate in a clockwise direction, and the rotary cutting device 114b can be configured to rotate in a counter clockwise direction to perform coping cuts on the respective workpieces 110a, 110b. Thus, knives 116a of the rotary cutting device 114a can be configured to rotate clockwise to perform a coping cut on the workpiece 110a when situated proximate a right side of the opening 112 of the workpiece platform 104. The knives 116b, on the other hand, can be configured to rotate counter clockwise to perform a coping cut on the workpiece 110b when situated proximate a left side of the opening 112 of the workpiece platform 104. Accordingly, the rotary cutting devices 114a, 114b can perform coping cuts on right or left ends of respective workpieces 110a and 110b.

The rotary cutting devices 114a, 114b can have any suitable position and/or orientation relative to one another. In some examples, the rotary cutting devices 114a, 114b can be oriented such that their respective axes of rotation Ra, Rb are parallel and laterally offset from one another. In one aspect, the rotary cutting devices 114a, 114b can be at the same vertical position or different vertical positions relative to the workpiece platform 104 (e.g., the support surface 108). In addition, the rotary cutting devices 114a, 114b can be configured for simultaneous and/or independent vertical position adjustment. In another aspect, a lateral distance or spacing between the rotary cutting devices 114a, 114b can be adjustable.

The rotary cutting devices 114a, 114b can be operably coupled to the motor 106 in any suitable manner for rotatably driving the rotary cutting devices 114a, 114b with the motor 106 during operation. The motor 106 can be operably coupled to the rotary cutting devices 114a, 114b in any suitable manner known in the art, such as directly or indirectly coupled via a direct axle linkage, a belt-pulley system, chain-driven belt drive, geared rotary system, etc. to transfer rotary motion from the motor 106 to the rotary cutting devices 114a, 114b. In the illustrated example, the motor 106 is schematically shown coupled to the rotary cutting devices 114a, 114b via gears 150a, 150b. In particular, the motor 106 can be coupled to the gear 150a (e.g., by a drive or output shaft), which can interface with gear teeth of the rotary cutting device 114a to rotate the rotary cutting device 114a in a clockwise direction. In addition, the gear 150b can interface with the gear 150a to receive drive torque from the motor 106. The gear 150b can interface with gear teeth of the rotary cutting device 114b to rotate the rotary cutting device 114b in a counter clockwise direction. Thus, the motor 106 can simultaneously drive the rotary cutting devices 114a, 114b in opposite rotational directions. Although the motor 106 is shown schematically as coupled to the rotary cutting device 114a, it should be recognized that the motor 106 can be coupled to the rotary cutting device 114b. In some examples, each of the rotary cutting devices 114a, 114b can be driven by separate and distinct motors, as opposed to being driven by a common motor.

Figure 5:
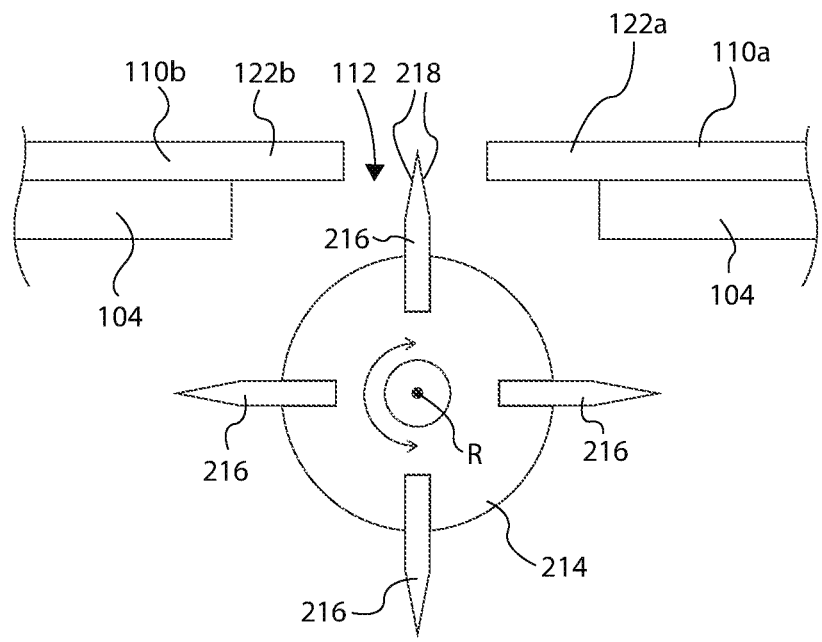
FIG. 5 is a schematic side view of a rotary cutting device of a coping cut machine, and showing bi-directional rotation of the rotary cutting device to cut either the right or left workpieces, in accordance with an example of the present disclosure.

In another example illustrated in FIG. 5, a rotary cutting device 214 can be operable bi-directionally by a suitable motor that is configured to selectively rotate the rotary cutting device 214 either clockwise or counter clockwise. Thus, knives 216 of the rotary cutting device 214 can be used to perform a coping cut on the first workpiece 110a when rotated clockwise, where the first workpiece 110a is situated proximate a right side of the opening 112 of the workpiece platform 104. And, the knives 216 can be used to perform a coping cut on the second workpiece 110b when rotated clockwise, where the second workpiece 110b is situated proximate a left side of the opening 112 of the workpiece platform 104. This is possible because each knife 216 can have a double-sided blade edge 218, as illustrated, so that the rotary cutting device 214 can perform coping cuts on right or left ends of respective workpieces 110a and 110b. This is beneficial because it accommodates carpentry installation in either direction through a room. Indeed, some carpenters prefer to install molding around the room from "left to right", which is illustrated by the joining of the workpieces in FIG. 7 using the rotary cutting device (e.g., 114 or 214) in a clockwise cutting direction. However, other carpenters prefer to work from "right to left" through a room, which requires coping cuts on right end of the workpiece 110b, which is achievable by reversing the rotational direction of the rotary cutting device 214 to rotate counter clockwise to cut the end 122b of the workpiece 110b. In another example, workpiece alignment member(s) may not be incorporated, and instead one or more indicia (e.g., grooves, tape, and markings) can be part of, or installed onto, the workpiece platform to provide a visual guide for the carpenter to use when aligning a workpiece relative to the rotary cutting device to perform a coping cut. In this way, the coping cut machine 100 would be devoid of components above the workpiece platform (except for the knife that would pass above the support surface during rotation, and maybe a portion of the body of the rotary cutting device). In the example of the coping cut machine 100 having one or more workpiece alignment members 118a and/or 118b, the coping cut machine 100 is devoid of components above such at least one workpiece alignment member. This provides a less complicated, user friendly machine that a carpenter can utilized to quickly perform a coping cut without operating a number of different devices, such as an overhead press or rollers or other such components.

FIGS. 8-13 illustrate a method of performing a coping cut on a crown molding workpiece 310a with the coping cut machine 100, in accordance with an example of the present disclosure. In one example, each workpiece alignment member 118a and 118b can be secured to the workpiece platform 104 by an attachment device component, such as by respective pivot pins 130a and 130b that are secured to the workpiece platform 104 and extend through apertures in respective workpiece alignment members 118a and 118b. Other suitable attachment components can be utilized. In this manner, the workpiece alignment members 118a and 118b can pivot relative to the workpiece platform 104 from proximate the opening 112 (e.g., either side of the opening 112) to accommodate cutting the workpiece 310a at an angle (as compared to the position of FIG. 2). For instance, the workpiece alignment member 118a can be rotated clockwise from an orthogonal cutting position (FIG. 1A) to a transverse cutting position of FIGS. 8 and 9. The phrase "orthogonal cutting position" can mean a position in which a longitudinal axis L1 of the workpiece alignment member 118a is substantially orthogonal (i.e., perpendicular) relative to the axis of rotation R of the rotary cutting device 114, as shown in FIG. 2. Note that the longitudinal axis L1 can extend along or be defined by the planar guide surface 120a of the workpiece alignment member 118a (and similarly with the other workpiece alignment member 118b). The phrase "transverse cutting position" can mean a position in which the longitudinal axis L1 of the workpiece alignment member 118a is at a transverse acute angle relative to the axis of rotation R of the rotary cutting device 114 (i.e., non-orthogonal, or non-collinear). The transverse angle can correspond to an angle of a miter cut of the workpiece 310a, as discussed below.

Once the workpiece alignment member 118a is rotated into a desired position, such as at angle A1 of 45 degrees (or other suitable angle), a stabilization stop device 132a can be operated or otherwise positioned behind the workpiece alignment member 118a to act as a stop to hold the workpiece alignment member 118a at the desired angle A1 during cutting. The stabilization stop device 132a can be a push-pin spring device supported by the workpiece platform 104, and configured such that a user can push downwardly the stabilization stop device 132a to move it between the retracted and extended positions. Alternatively, a sliding pin can be oriented in the workpiece alignment member with complimentary receiving holes distributed at different locations in the workpiece platform 104. However, any other mechanism can also be used to moveably and securely position the workpiece alignment members 118a/118b at a desired angle. Noticeably, FIG. 1A shows the stabilization stop device 132a retracted into an aperture of the workpiece platform 104, and FIG. 8 shows the stabilization stop device 132a extended upwardly from the workpiece platform 104. Alternatively, the stabilization stop device 132a can be threaded bolt that can be removably installed to the workpiece platform, or a clamp or other device supported by the workpiece platform 104 or the workpiece alignment member 118a to act as a stop.

In some examples, the coping cut machine 100 can include a plurality of stabilization stop devices 132a-d to accommodate different angled coping cuts of an end 322a of the workpiece 310a. For instance, the stabilization stop device 132c can be operated to situate the workpiece alignment member 118a at an angle A2, such as at 60 degrees relative to the axis of rotation R of the rotary cutting device 114. In another example, the workpiece platform 104 can include four or more stabilization stop devices to accommodate varying, desirable angles of the workpiece alignment members 118a and 118b relative to the rotary cutting device 114.

Note that the coping cut machine 100 can include a pair of normal stop devices 134a and 134b supported by the workpiece platform 104, similarly as the stop devices 132a-d, which can be utilized to maintain the orthogonal cutting positions of the workpiece alignment members 118a and 118b, as shown in FIG. 2.

In one example illustrated in FIG. 9, the workpiece platform 104 can comprise an arcuate or radial slot 140 formed through the support surface 108 for providing variable positioning of the workpiece alignment member 118b. More specifically, a spring stop device 142 can be supported by the workpiece alignment member 118b and can be operable by a user to set the position of the workpiece alignment member 118b at a desired position to accommodate varying degrees of coping cuts. Note that the spring stop device 142 is shown schematically, but it can comprise any suitable configuration that may include a spring (e.g., coil spring) and a movable body (e.g., screw body) biased by the spring to a nominally locked position where a portion of the movable body extends through the radial slot 140 to the lower side of the workpiece platform 104, in one example. Thus, the user can pull upwardly the movable body, which compresses the spring and releases the workpiece alignment member 118b from engagement with the workpiece platform 104 (e.g., releasing a friction force), and then the user can rotate the workpiece alignment member 118b to a desired angular position. Upon release of the spring stop device 142, the movable body can re-engage with the workpiece platform 104 to generate a friction force sufficient to hold in-place the workpiece alignment member 118b relative to the workpiece platform 104 at a desired position. Then, the user can engage a workpiece with the coping cut machine 100 to perform a coping cut, as described above. Note that a similar radial slot 140 can be formed on the other side of the opening 112, such that the other workpiece alignment member 118a can be variably positioned in a similar manner described above via operation of a spring stop device supported by the workpiece alignment member 118a.

Figure 12:
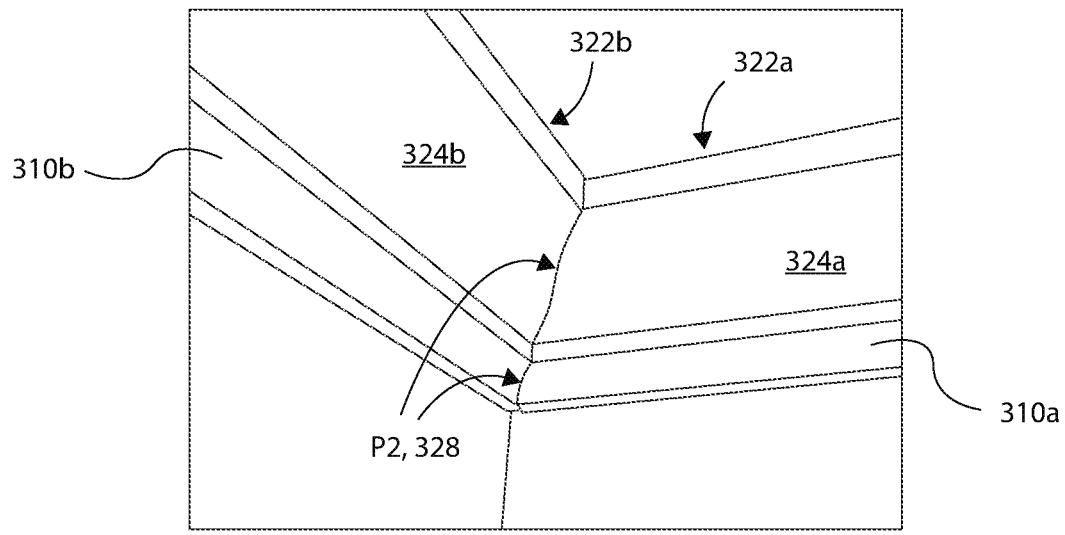
FIG. 12 shows the right workpiece of FIG. 10 mated or interfaced to the adjacent workpiece and installed to the wall.

The reason to perform a coping cut on the workpiece 310a at a transverse acute angle is because, as with (most) crown molding, an angled coping cut (i.e. compound two-axis cut) is required to ensure proper mating with an adjacent workpiece 310b, as illustrated in FIGS. 10-13. This is because a crown molding workpiece is installed to adjacent walls (side wall and ceiling) at an angle along the length of a ceiling corner to conceal the corner. Thus, the coping cut profile of the workpiece 310a must be formed at an angle to minimize the appearance of any gaps at the joint between the workpieces 310a and 310b, as illustrated in FIG. 12.

Figure 10:
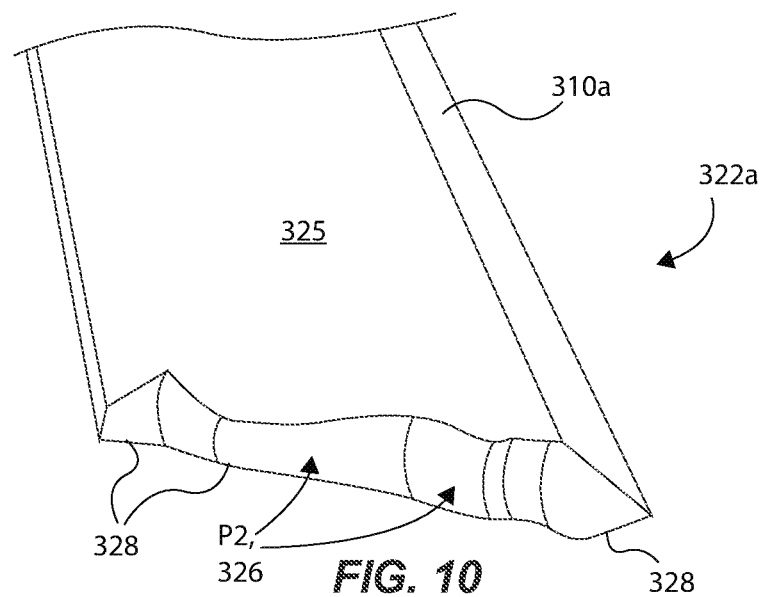
FIG. 10 shows further details of a coping cut profile of the right workpiece of FIG. 9.
Figure 11:
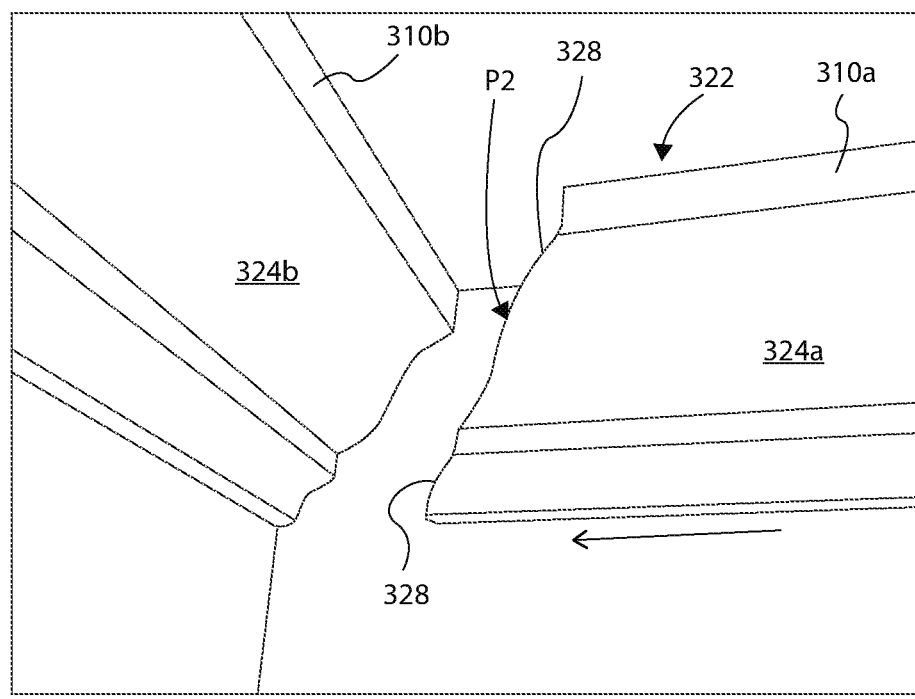
FIG. 11 shows the right workpiece of FIG. 10 near an adjacent workpiece (i.e., crown molding) installed to a wall.
Figure 13:
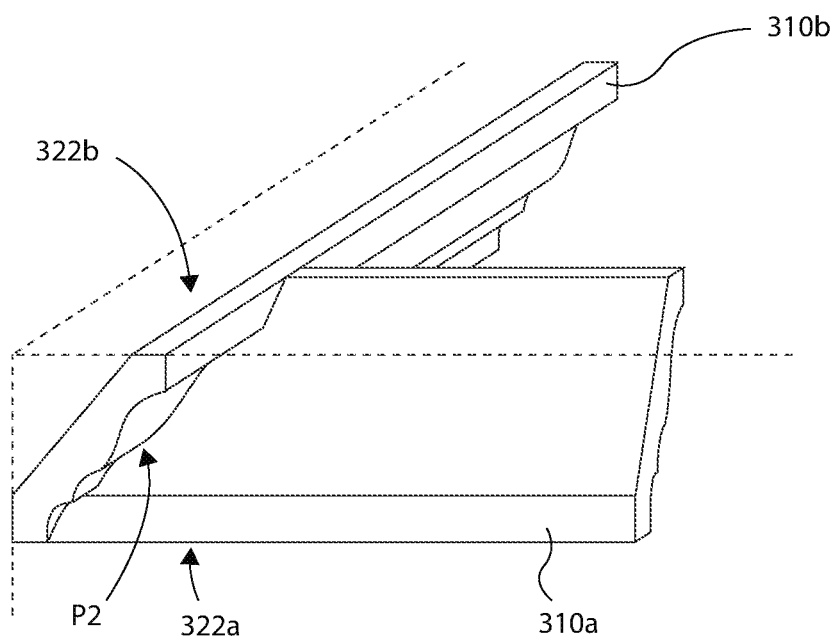
FIG. 13 shows a backside of the mated workpieces of FIG. 12 (with the walls hidden from view).

Prior to performing a coping cut, a user can initially perform a miter cut (e.g., with a chop saw) to the end 322a of the workpiece 310a at a 45 degree angle (in the scenario of a typical corner area of a room, as shown in FIG. 13). The angle of the miter cut would be the same as the angle A1 (i.e., 45 degrees) set for the workpiece alignment member 118a, as shown in FIG. 8. Then, the user can overly a backside of the workpiece 310a onto the support surface 108 of the workpiece platform 104, and then interface a top edge of the workpiece 310a along the support surface 120a of the workpiece alignment member 118a. This is the transverse cutting position shown in FIG. 9, in which the end 322a of the workpiece 310a is proximate or adjacent to the opening 112 of the workpiece platform 104. Then, with the motor 106 activated and rotating the rotary cutting device 114 in the clockwise direction, the user can slide the workpiece 310a along the workpiece platform 104 and along the workpiece alignment member 118a toward the rotary cutting device 114 to a position until the knife 316 cuts the end 322a of the workpiece 310a while at the transverse cutting position. This generates a coping cut profile P2 defined by a side surface 326 that extends from the top to the bottom of the workpiece 310a. Similarly, as discussed above regarding FIGS. 1-4, because of the manner in which the knife 316 rotates and cuts the workpiece 310a along an arc when performing the coping cut, the side surface 326 will have a slight curved cut from an outer surface 324a to the backside surface 325 of the workpiece 310a. FIG. 10 shows that the side surface 326 has a downward curved angle cut because of the rotational directional cut of the knife 316, which generates a forward facing edge 328 that is the farthest most edge or portion of the end of the workpiece 310a. So, this forward facing edge 328 of the workpiece 310a can further define the coping cut profile P2.

In this way, the forward facing edge 328 of the side surface 326 can be interfaced to an outer surface 324b of an adjacent workpiece 310b when installed to minimize or eliminate any unacceptable or undesirable gaps between the joint of the workpieces 310a and 310b when installed. More particularly, the adjacent workpiece 310b is similarly shaped or the same style of crown molding of the workpiece 310a, but instead has a straight-edge cut (and not a miter cut). Initially, the adjacent workpiece 310b can be installed or secured to a wall in a suitable manner (e.g., glue, carpentry nails). Then, the workpiece 310b, which has the coping cut profile P2, can be slidably interfaced against the outer surface 324b of the workpiece 310b, so that at least the forward facing edge 328 of the side surface 326 is interfaced to the outer surface 324b of the workpiece 310b. Then, the workpiece 310b can be installed the adjacent/orthogonal wall. Note that, depending on the length of the workpiece 310a relative to the length of the wall it is installed onto, the workpiece 310a may not be slid in the direction indicated by the arrow, and may otherwise be pushed against the wall and the ceiling while the side surface 326 slides along the outer surface 324b of the adjacent workpiece 310b.

The knife 316 can have a different cutting profile than that of the knife 116. Accordingly, various types or shapes of knives can be interchanged with the rotary cutting device 114 depending on the type or shape of workpiece to be cut by the coping cut machine 100.

Thus, other than an optional dust shield removably oriented above the rotary cutting device, the coping cut machine can generally be free of any structure above the rotary cutting device. An optional dust shield may be transparent to allow visible inspection and protection to the operator from flying debris during cutting and may be movable to allow cleaning or adjustment.

Figure 14:
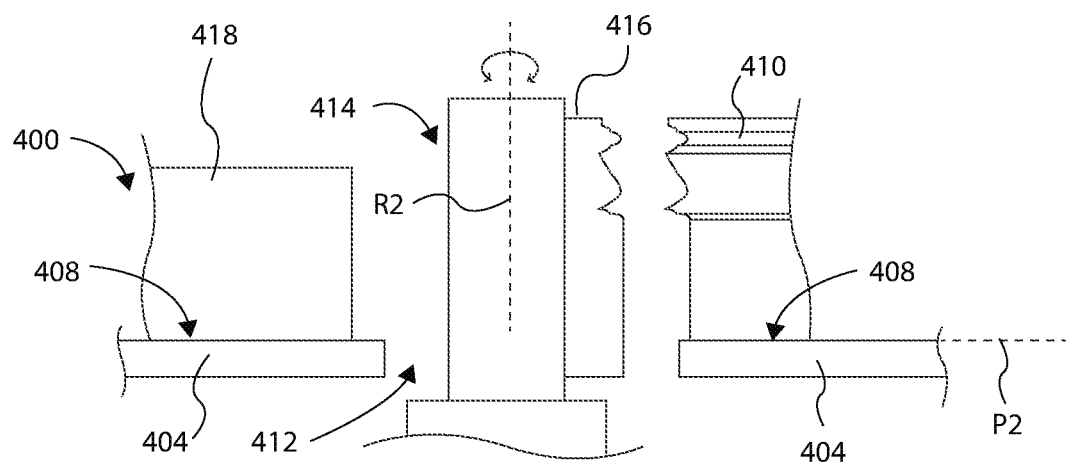
FIG. 14 is a coping cut machine, in accordance with an example of the present disclosure.

FIG. 14 illustrates a coping cut machine 400 (only showing a portion thereof) that includes a rotary cutting device 414 oriented vertically, as opposed to the horizontal orientation of the rotary cutting device 114 of FIG. 1. More specifically, the coping cut machine 400 can comprise a workpiece platform 404 supported by a base structure (e.g., 102), and the workpiece platform 104 can further comprise an opening 412 formed through a support surface 408. The opening can be circular, oval, rectangular, irregular, or an open slot, which can be formed through the workpiece platform 104. The rotary cutting device 414 can be operably coupled to a motor (e.g., 106) in a suitable manner for rotatably driving the rotary cutting device 414 to rotate about an axis of rotation that is generally orthogonal or perpendicular to a plane P2 defined by the support surface 408.

The rotary cutting device 414 can be the same or similar as the rotary cutting device 114, and therefore can comprise at least one knife 416 for performing a coping cut on a workpiece 410 that is supported vertically by the support surface 408. The upper end of the rotary cutting device 414 can be supported by a collar bearing supported by the base structure, or the upper end can be unsupported as illustrated. The lower end of the rotary cutting device 414 can be supported by the base structure, and operably coupled to the motor for rotation thereof.

Note that the coping cut machine 400 can comprise one or more workpiece alignment members 418 (only one illustrated on the left side because the other one is hidden from view by the workpiece 410). The workpiece alignment member 418 can have the same or similar functionality as described above regarding workpiece alignment members 118a and 118b.

Figure 15:
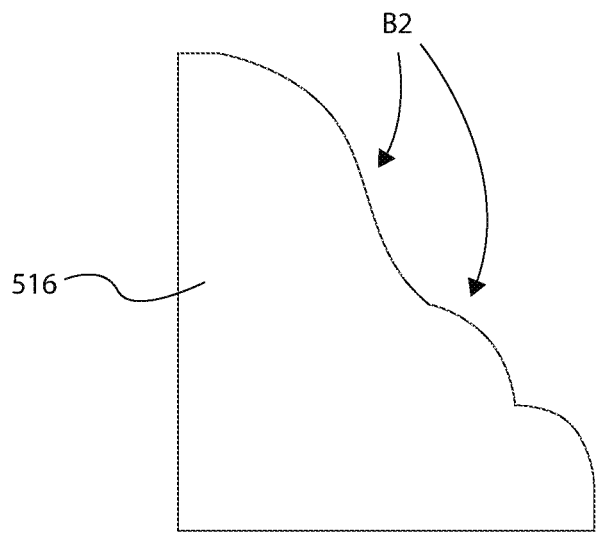
FIG. 15 is a knife of a rotary cutting device, in accordance with an example of the present disclosure.

FIG. 15 illustrates a crown molding knife 516 having a blade profile B2 that corresponds to the coping cut profile (e.g., P2) of a crown molding workpiece (e.g., 310a of FIG. 10). The knife 516 can be removably secured to the cylindrical rotary body of any of the example rotary cutting devices described herein. In this example, the blade profile B2 is defined by a number of blade edge transitions (curved edges, straight edges, etc.) that are a mirror image (or reverse) of an outer surface (e.g., 324a) of a workpiece (e.g., 310b). Note that the blade profile B2 is partially cone-shaped having a downward tapering profile, which accommodates performing a coping cut on a crown molding workpiece without the requirement to position the workpiece at a transverse cutting position. That is, when using the knife 516 to perform a coping cut, a crown molding workpiece can be positioned perpendicular to the axis of rotation of the rotary cutting device (i.e., in the position of FIG. 2). Beneficially, a workpiece alignment member (e.g., 118a) does not need to be set to a transverse angle (e.g., as in FIG. 9), because the blade profile B2 can perform a crown molding coping cut (e.g., FIG. 10) because of the particular shape of the blade profile B2. This helps to simplify a coping cut on a crown molding workpiece because it eliminates the chances of error from a user setting the position of a workpiece alignment member at an incorrect angle prior to performing a coping cut. Alternatively, a particular rotary cutting device can be a solid body having a cone shaped cutting body (e.g., a forged or machined body of steel) having a cutting edge similar to the blade profile B2. That is, a separate knife (i.e., 516) is not necessary in such alternative example.

Figure 16:
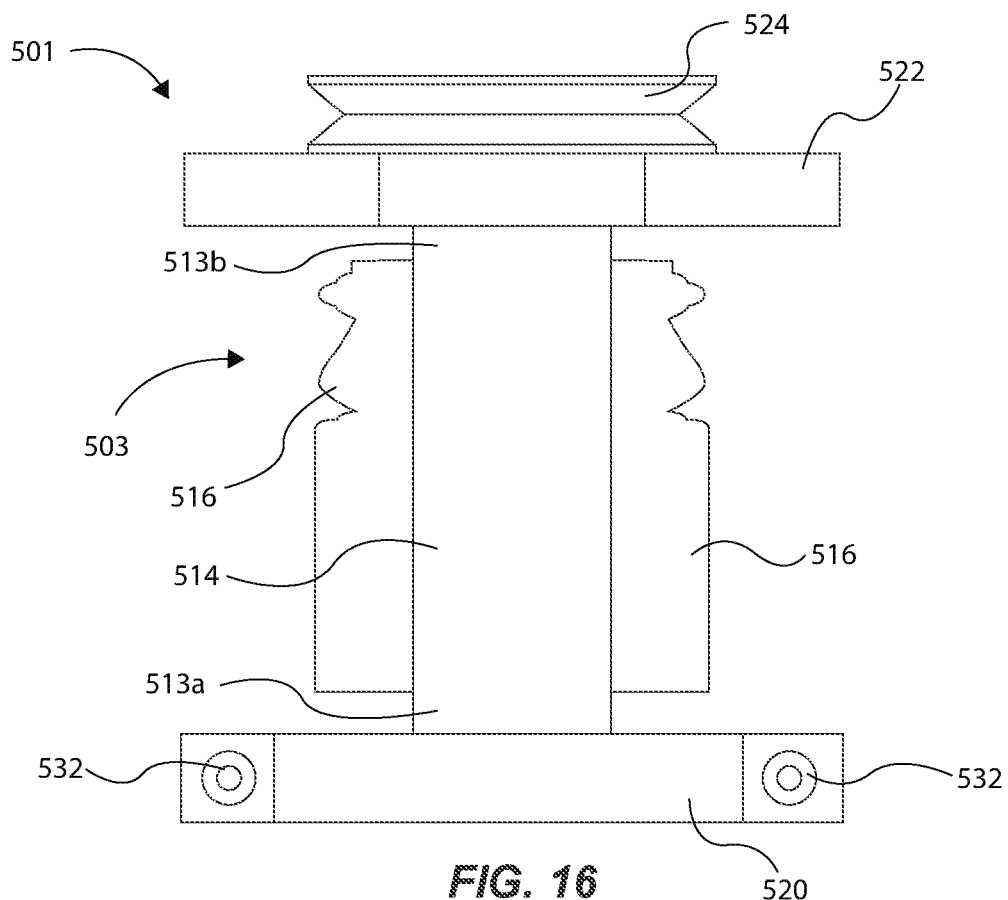
FIG. 16 is a portion or section of a coping cut machine having a modular rotary cutting mechanism, in accordance with an example of the present disclosure.

FIGS. 16-19 illustrate aspects of a representative assembly section 501 of a coping cut machine (e.g., 100) in accordance with an example of the present disclosure, which can include a modular rotary cutting assembly 501 that is removable and replaceable. More specifically, FIG. 16 is a top down view that shows the modular rotary cutting assembly 501 having a rotary support body 514 and the at least one knife 516 supported by the rotary support body 514. Typically, the at least one knife can be oriented parallel to a rotation axis of the cutting assembly. A first end 513a of the rotary support body 514 can be rotatably supported by a release support mechanism 520, and a second end 513b of the rotary support body 514 can be supported by a bearing structure 522 and driven by a drive wheel 524. As detailed below, the release support mechanism 520 can facilitate removal of the modular rotary cutting assembly 501, and replacement with another modular rotary cutting assembly, such as may be desirable for using different shaped knives without having to replace the knives 516. Replacing knives 516 may result in human error from improper installation, which may generate defective coping cuts. Thus, the modular rotary cutting assembly 501 can be marketed and sold as an assembly with knives that are installed during manufacture and assembly to ensure that the position and placement of the knives has high or tight tolerances to provide accurate coping cuts during use.

Figure 17:
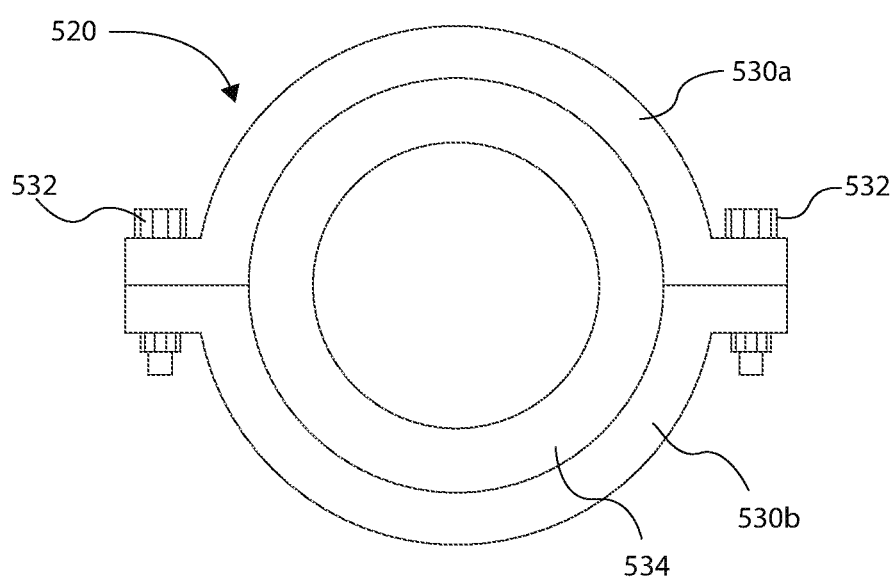
FIG. 17 is a side view of a release support mechanism of FIG. 16.

The release support mechanism 520 can be a quick-release device or mechanism operable by a user to quickly remove the modular rotary cutting assembly 501 from a coping cut machine. FIG. 17 shows a side view of one example of a quick-release device, such as the release support mechanism 520, which can include a pair of support clamps 530a and 530b coupled together by fasteners 532. A collar bearing 534 may be supported within the clamps 530a and 530b for rotatably supporting the lower end of the rotary support body 514. Thus, a user can remove the fasteners 532 and the clamps 530a and 530b to remove the modular rotary cutting assembly 501 from the coping cut machine. Other quick-release devices are contemplated herein, such as one that operates by a release lever, etc. Note that the release support mechanism 520 would be structurally supported by a support structure of the coping cut machine in a suitable manner (e.g., the clamp 530b may be secured to a structure) to support the modular rotary cutting assembly during use.

Figure 18:
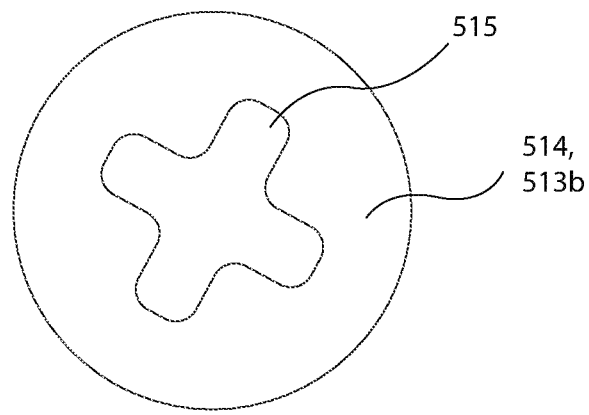
FIG. 18 is an end view of the modular rotary cutting mechanism of FIG. 18 (without the knives), in accordance with an example of the present disclosure.

FIG. 18 shown a front view of the second end 513b of the rotary support body 514. The second end 513b can have a circumferential perimeter that is rotatably supported by the bearing structure 522 (FIG. 16). The second end 513b can comprise a keyed profile portion 515 that extends outwardly (or inwardly) from the second end 513b as a protrusion body or a recess. The keyed profile portion 515 can have a non-circular shaped outer surface profile, such as the "plus" sign shown, or other shapes such as triangle, rectangle, polygon, irregular, etc. The keyed profile portion 515 can be received and supported by the drive wheel 524, which is also shown in the side view of FIG. 19. That is, the drive wheel 524 can comprise a complimentary keyed profile aperture 525 that is sized and shaped similarly as the keyed profile portion 515 (although slightly larger), so that the keyed profile portion 515 can be inserted by a user into the keyed profile aperture 525. In this manner, rotation of the drive wheel 524 causes rotation of the rotary support body 514 to perform a coping cut receives the keyed profile portion of the rotary support body. As noted above, when the user releases the first end 513a of the rotary support body 514 from the release support mechanism 520 to replace the modular rotary cutting assembly 501, for instance, the user can then slide out or remove the keyed profile portion 515 from the keyed profile aperture 525, thereby releasing the modular rotary cutting assembly 501 from the coping cut machine.

Figure 19:
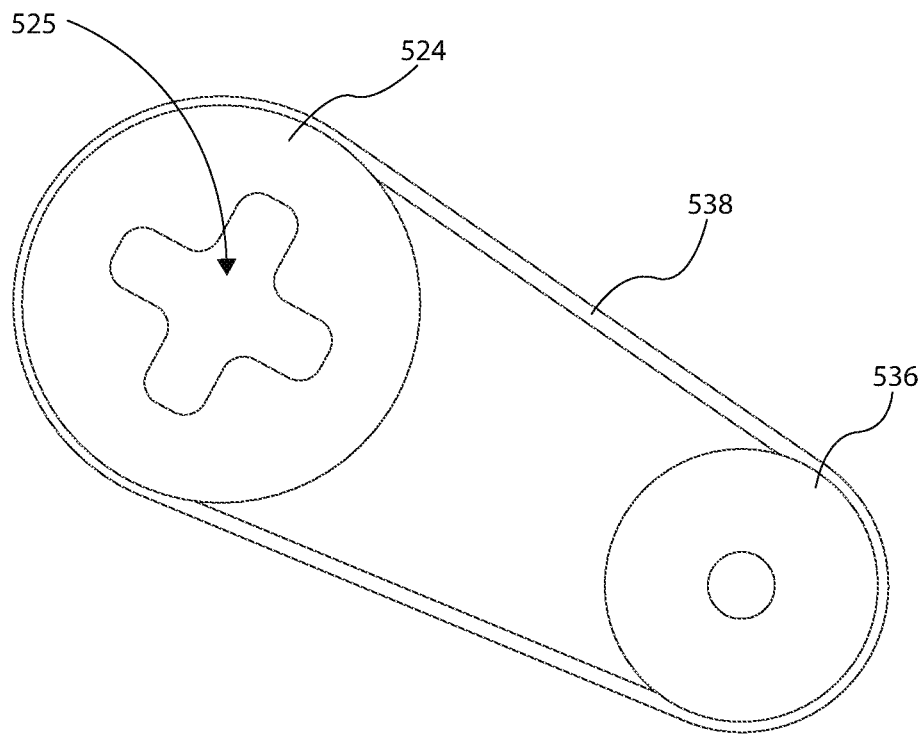
FIG. 19 is a side view of a drive wheel of FIG. 16, as driven by a drive shaft and transmission belt, in accordance with an example of the present disclosure.

In one example shown in FIG. 19, a drive shaft 536 (driven by a motor) can transmit a torque to the drive wheel 524 via a transmission belt 538 to cause rotation of the drive wheel 524, and thereby rotation of the modular rotary cutting assembly 501. In another variation, a second modular cutting assembly can be driven by transmission belt 538 (i.e. a three-way system). In this way, a first cutting assembly can be oriented to cut a left end of a workpiece, while the second cutting assembly cut be oriented to cut a right end of a workpiece. Note that both cutting assemblies would be rotating in a common direction although the cutting blades can be opposite one another to allow for smooth cutting from either right or left directions. Regardless, other transmission types are possible, such as mentioned above and including belts, gear driven, chains, etc.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A coping cut machine, comprising:
   a workpiece platform comprising a support surface for receiving a workpiece, wherein the support surface defines a single opening;
   a first rotary cutting device and a second rotary cutting device positioned under the workpiece platform, each of the first rotary cutting device and second rotary cutting device supporting at least one coping knife, wherein the at least one coping knife is removably coupled to the first and second cutting devices and oriented parallel to a rotation axis of the first and second cutting devices, wherein the at least one knife at least partially extends through and beyond the single opening, and wherein the first rotary cutting device is configured to rotate in a clockwise direction, and the second rotary cutting device is configured to rotate in a counter clockwise direction;
   at least one workpiece alignment member supported by the workpiece platform for aligning the workpiece supported by the workpiece platform relative to the first and second rotary cutting devices; and
   wherein in response to sliding the workpiece along the at least one workpiece alignment member and during rotation of the first and second rotary cutting devices, the at least one coping knife operates to perform a coping cut on an end of the workpiece.

2. The coping cut machine of claim 1, wherein the at least one coping knife comprises a blade profile shaped to perform the coping cut on a baseboard molding workpiece, wherein the blade profile corresponds to an outer surface profile of the baseboard molding workpiece.

3. The coping cut machine of claim 1, wherein the at least one coping knife comprises a blade profile shaped to perform the coping cut on a crown molding workpiece, wherein the blade profile at least partially corresponds to an outer surface profile of the crown molding workpiece.

4. The coping cut machine of claim 3, wherein the at least one workpiece alignment member is selectively movable relative to the workpiece platform to position the crown molding workpiece at a transverse angle relative to the first and second rotary cutting devices to facilitate a crown molding coping cut on the crown molding workpiece with the at least one coping knife.

5. The coping cut machine of claim 4, wherein the at least one workpiece alignment member comprises a pair of workpiece alignment members situated on either side of the single opening of the workpiece platform, wherein each workpiece alignment member is configured to position a crown molding workpiece at a transverse angle relative to the first and second rotary cutting devices to facilitate the crown molding coping cut on the crown molding workpiece with the at least one coping knife.

6. The coping cut machine of claim 4, further comprising at least one positional adjustment device supported by workpiece platform, the at least one positional adjustment device operable with the at least one workpiece alignment member to selectively position the at least one workpiece alignment member to accommodate different angles of cuts of a crown molding workpiece.

7. The coping cut machine of claim 1, further comprising a workpiece interface surface of the at least one workpiece alignment member configured to interface with a side edge of the workpiece to position the workpiece relative to the first and second rotary cutting devices.

8. The coping cut machine of claim 1, wherein the coping cut machine is devoid of components above the at least one workpiece alignment member.

9. The coping cut machine of claim 1, wherein the workpiece platform comprises support surface that is defined by a right side surface and a left side surface, wherein the right side surface is operable to support a first workpiece for the coping cut on a right end of the first workpiece, and wherein the left side surface is operable to support a second workpiece for the coping cut on a left end of the second workpiece.

10. The coping cut machine of claim 1, further comprising a portable base structure positionable on a ground surface, the portable base structure supporting the workpiece platform and a motor for driving the first and second rotary cutting devices.

11. The coping cut machine of claim 1, wherein the at least one coping knife comprising a blade profile that is non-linear.

12. The coping cut machine of claim 1, wherein the first and second rotary cutting devices are operable about an axis of rotation generally orthogonal relative a horizontal plane defined by the workpiece platform.

13. The coping cut machine of claim 1, wherein the first and second rotary cutting devices comprises a modular rotary cutting assembly comprising a rotary support body and the at least one coping knife, wherein the rotary support body comprises a keyed profile portion supported by a drive wheel of the coping cut machine, wherein the drive wheel comprises a keyed profile aperture that receives the keyed profile portion of the rotary support body.

14. The coping cut machine of claim 13, wherein the other end of the rotary support body is rotatably supported by a quick-release mechanism of the coping cut machine, such that the modular rotary cutting assembly is removable and replaceable via operation of the quick-release mechanism and removal of the keyed profile portion from the keyed profile aperture.

\* \* \* \* \*